United States Patent [19]

Kauzlarich et al.

[11] Patent Number: 4,989,920
[45] Date of Patent: Feb. 5, 1991

[54] SELF-DAMPING CASTER WHEEL

[75] Inventors: James J. Kauzlarich, Chile; Colin A. McLaurin, Charlottesville, both of Va.

[73] Assignee: University of Virginia Alumni Patents Found., Charlottesville, Va.

[21] Appl. No.: 498,543

[22] Filed: May 27, 1983

[51] Int. Cl.$^5$ .............................................. B60T 7/12
[52] U.S. Cl. ............................. 301/63 PW; 301/36 R
[58] Field of Search ............... 301/63 PW, 64 R, 65, 301/36 R; 16/18 R, 45, 47, 48, 35 D; 152/376, 379.3, 306

[56] References Cited

U.S. PATENT DOCUMENTS

| | | | |
|---|---|---|---|
| 1,210,580 | 1/1917 | Wellsteed | 152/376 |
| 2,541,514 | 2/1951 | Herold | 16/47 |
| 3,071,389 | 1/1963 | Ulinski | 280/79.1 |
| 3,345,675 | 10/1967 | Haydock | 16/45 |
| 4,321,727 | 3/1982 | Sheiman et al. | 16/1 BR |
| 4,377,883 | 3/1983 | Folson | 16/47 |

FOREIGN PATENT DOCUMENTS 0052528 5/1982 European Pat. Off. ................. 16/45
2119042 11/1983 United Kingdom ..................... 16/45

OTHER PUBLICATIONS

Bassicik "Double Ball Race Steel Truck Casters" Oct. 18, 1949.

Primary Examiner—Russell D. Stormer
Attorney, Agent, or Firm—Bradford E. Kile

[57] ABSTRACT

A caster wheel which enhances critical shimmy velocity so as to minimize shimmy effects in operation. Two tread surface for contact with a ground surface and a pivot assembly for pivoting the wheel about a first vertical axis displaced from a second vertical axis extending through the center point of the wheel are provided such that the separation between the two tread surfaces strategically relate via a mathematical equation to said displacement in a manner for achieving a desired critical shimmy velocity.

6 Claims, 2 Drawing Sheets

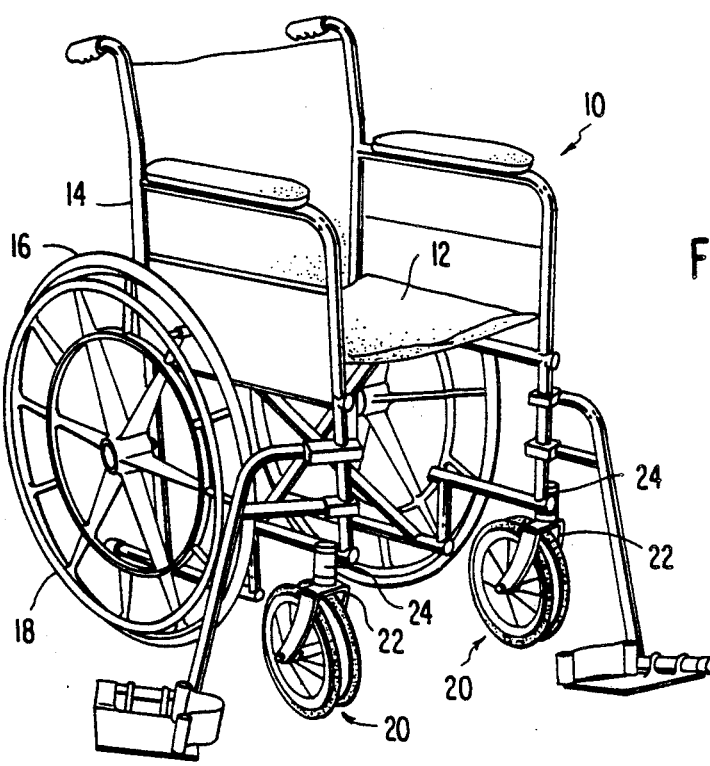
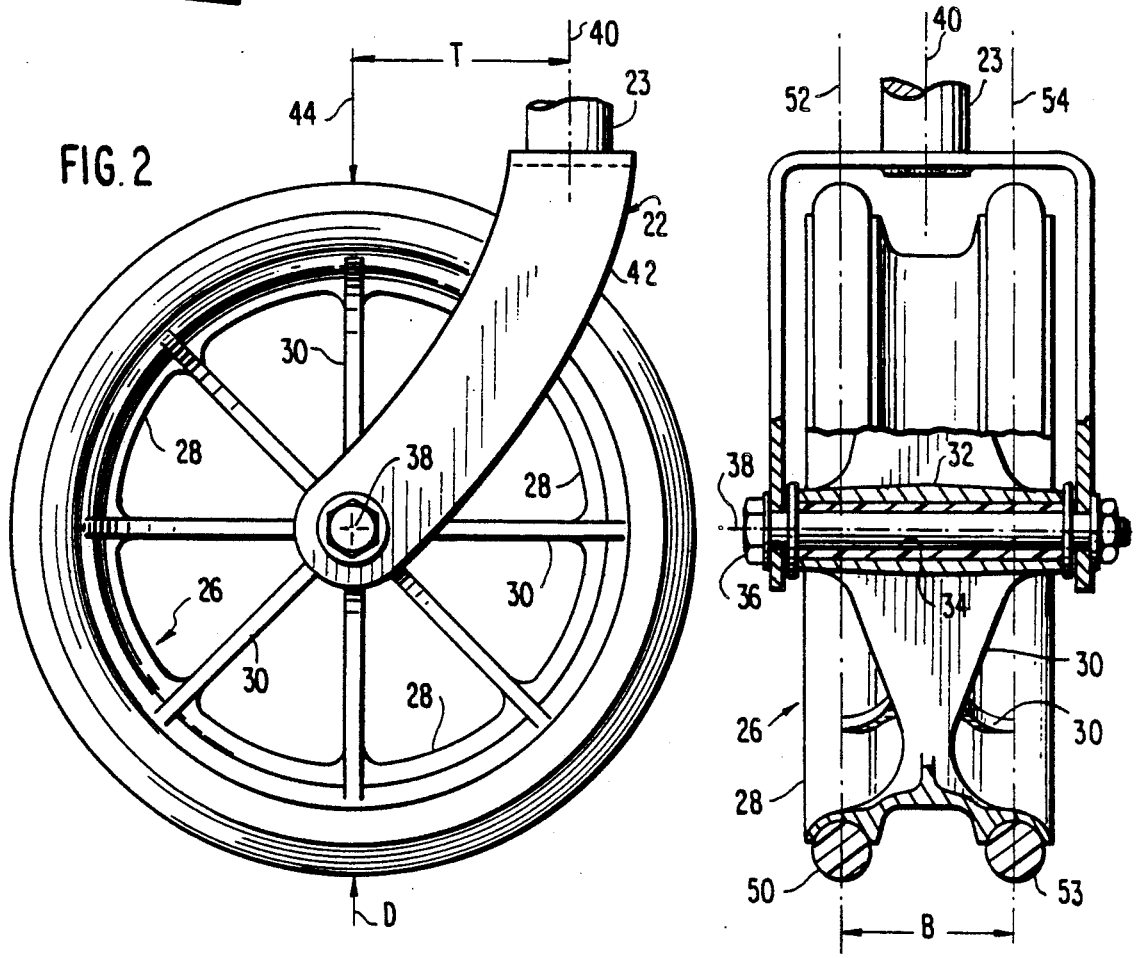

SELF-DAMPING CASTER WHEEL

BACKGROUND OF THE INVENTION

This invention relates to a caster wheel which minimizes self-excited vibration. More particularly, this invention is directed to a caster wheel operable for safe use with a wheelchair, gurney, cart, and the like.

Caster wheels have been widely utilized in the past for a wide variety of purposes in environments where free steering is desired. Caster wheels are journalled about a vertical thrust bearing and when pointed exactly in the direction of motion of the object there is no driving force for an undesirable, self-excited vibration. If there is any disturbance that causes a deviation of the caster wheel's direction or a transverse acceleration of the frame, however, a self-excited vibration, or shimmy, may begin. Once vibration is initiated, the amplitude will either diminish and cease or it will increase and persist. If caster wheel shimmy is permitted to continue or increase amplitude, it will tend to impede forward motion of the object to which it is journalled, increase the difficulty in steering, and present other control problems. Moreover, shimmy produces substantial forces on the vertical journal such that the physical integrity of the bearing may be jeopardized.

While caster wheel shimmy may be annoying with regard to a shopping cart or the like, shimmy problems can become significantly more critical with regard to caster wheels utilized for wheelchairs, gurneys, carts, and the like. In this connection, if a wheelchair caster is permitted to shimmy in an undamped fashion, more strength and dexterity is required by an operator of the chair. In the event a wheelchair is power driven, more energy is required of the motor assembly. This causes a reduction in battery energy which is already a limitation with powered wheelchairs. Still further, harmonic caster wheel shimmy has the potential of excessively wearing or damaging the frame of a wheelchair. Most significantly, excessive caster wheel shimmy may create a safety hazard in wheelchair or gurney use. In this regard, the onset of drag on a wheelchair due to shimmy of one of the caster wheels has the potential of causing the wheelchair to suddenly turn and even throw the user out of the chair.

In any or all of the above instances, a rider experiences at least some degree of discomfort and in some instances, caster shimmy presents a significant safety hazard.

Although it may be feasible to temporarily eliminate the effect of caster wheel shimmy with a manual wheelchair by reducing the speed of operation, such reduction in speed is quite inconvenient to an operator. With a motor driven unit, speed reduction is not always possible in time to prevent an accident.

The difficulties suggested in the preceding are not intended to be exhaustive but rather are among many which may tend to reduce the effectiveness of prior caster wheels. Other noteworthy problems may also exist; however, those presented above should be sufficient to demonstrate that caster wheels appearing in the past will admit to worthwhile improvement.

OBJECTS OF THE INVENTION

It is, therefore, a general object of the invention to provide a novel caster wheel which will obviate or minimize problems of the type previously described.

It is a specific object of the invention to provide a caster wheel which will minimize a tendency of the wheel to exhibit self-excited oscillations during operation.

It is a related object of the invention to provide a caster wheel for a wheelchair, gurney, cart, or the like, wherein unexpected wheel shimmy will be minimized.

It is another object of the invention to provide a novel caster wheel for a wheelchair or the like which may be facilely steered while minimizing the strength required to manipulate a manual chair or energy utilized by a motor driven chair.

It is yet another object of the invention to provide a novel caster wheel for a wheelchair, gurney, cart, and the like, wherein operating speed may be enhanced without producing a self-excited caster wheel oscillation.

It is a further object of the invention to provide a caster wheel for a wheelchair, gurney, cart, or the like, wherein large diameter caster wheels may be utilized to provide operator comfort without concomitantly producing a high potential for caster wheel shimmy.

BRIEF SUMMARY OF A PREFERRED EMBODIMENT OF THE INVENTION

A preferred embodiment of the invention comprises a caster wheel having a central hub with a horizontal axis of rotation which is journalled into a vertical bearing of a wheelchair or the like. A first peripheral tread portion extends about the hub for contacting a ground surface and lies in a plane perpendicular to the central axis of rotation of the hub. A second peripheral tread portion extends about the hub for simultaneous contact with the ground surface and lies in a plane mutually parallel with said first plane, but axially spaced therefrom. The exterior diameter of the tread portion about the hub is maintained between four and eight inches, while the axial distance between the first and second peripheral tread portions contacting a ground surface is critically selected to be between one-half and two inches, such that self-excited vibration of the caster wheel for the wheelchair is minimized.

THE DRAWINGS

Other objects and advantages of the present invention will be appreciated from the following detailed description of a preferred embodiment thereof taken in conjunction with the accompanying drawings wherein:

FIG. 1 is an axonometric view of a wheelchair disclosing the operating context of the subject invention;

FIG. 2 is a side view of a caster wheel in accordance with a preferred embodiment of the invention;

FIG. 3 is an end view, partially broken away to disclose internal detail of an axle bearing and an axial space between a first and second tread portion of the caster wheel operable to contact a ground surface;

Figure 4:
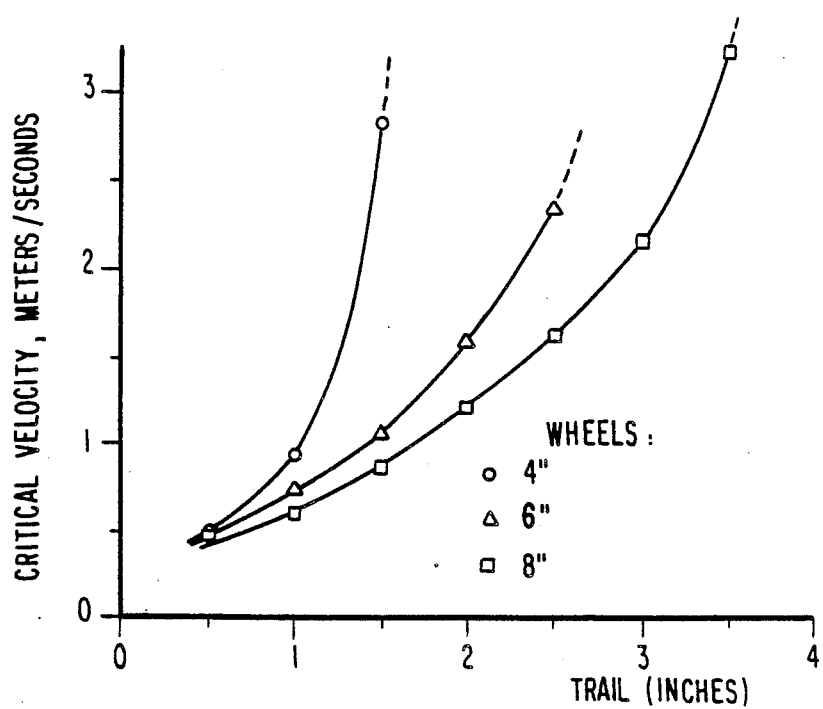
Figure 5:
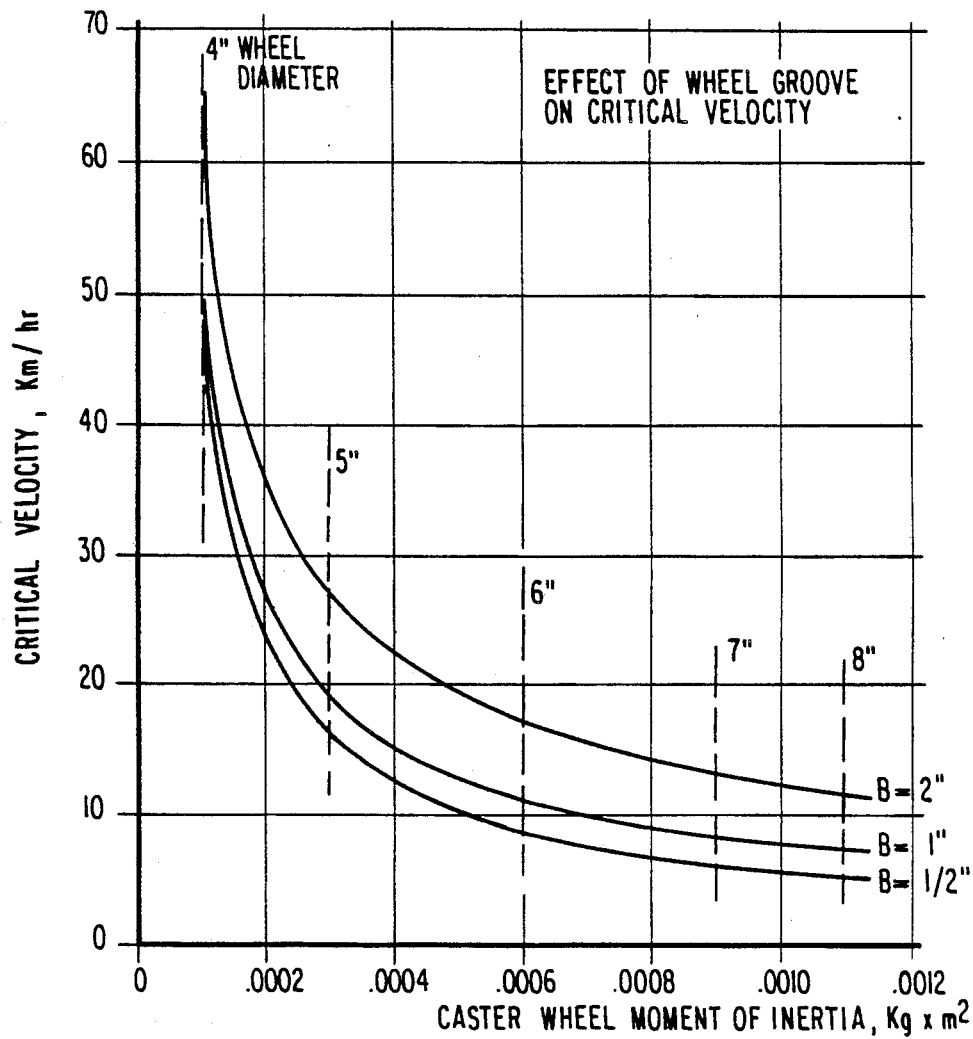

FIG. 4 discloses a relationship between critical velocity of a caster wheel and the amount of trail of a caster wheel in inches; and FIG. 5 discloses a relationship between critical velocity for a caster wheel as a function of moment of inertia of the wheel for a range of axial dimensions between the bearing treads of caster wheels in accordance with the instant invention.

DETAILED DESCRIPTION

Context of the Invention

Before describing in detail a preferred embodiment of the invention, a brief reference to the context of the invention is believed appropriate. The subject caster wheel is uniquely designed to be advantageously utilized in connection with medical equipment such as a wheelchair or a gurney and the like. In this regard, and by reference to FIG. 1, there will be seen a wheelchair 10 having a generally flexible seat portion 12 and a chair-like frame 14. Mobility for the wheelchair is provided by large, bearing wheels 16, which are manipulated by a handrail 18 in a manner well known by those skilled in the art. Foreward balance and turning guidance is provided by vertically journalled caster wheels 20 in accordance with a preferred embodiment of the invention. Each caster wheel 20 is horizontally journalled within a U-shaped frame 22 carrying an upright rod 23, note FIG. 2, which is vertically journalled within a bearing 24 mounted upon the wheelchair frame. Accordingly, the caster wheel is free to rotate and pivot about a vertical axis, as is well known in the art.

Caster Wheel

Turning now to FIGS. 2 and 3 there will be seen a caster wheel 20 in accordance with a presently preferred embodiment of the invention. The caster wheel includes a hub 26 having an outer rim 28, a plurality of spokes 30 and a central cylindrical bearing 32. A bearing sleeve 34 may be pressed into the cylindrical member 32 which is composed of a self-lubricating material such as polytetrafluoroethylene. The hub itself is preferably composed of a relative light-weight, high strength polymer such as polyurethane.

The hub 26 is journalled upon an axle 36 which extends through apertures in the distal ends of a U-shaped frame 22 which in turn is journalled to the frame 14 of a body, such as a wheelchair or the like, as discussed above. Accordingly, the hub 26 is free to rotate about a central axis of rotation 38 and pivot about a vertical axis 40.

As best seen in FIG. 2, the legs 42 of the U-shaped frame 22 are generally arcuate and the vertical axis 40 of the upright rod and bearing 24 is offset with respect to an imaginary vertical line 44 extending through the horizontal axis 38 of the hub 26. The distance "T" between the axis 40 and line 44 is known as the trail or the distance in which the axle of the caster wheel is offset behind the vertical pivot of the wheel during travel.

The rim 28 terminates with an outer contour and operably supports a first peripheral tread 50 which is supported by the rim within a first plane 52 which extends perpendicular to the central axis of rotation 38. The rim 28 also supports a second peripheral tread 53 which lies within a second plane 54 extending perpendicular to axis 38 and mutually parallel with plane 52. The tread portions 50 and 52 are preferably composed of a soft, resilient composition such as natural rubber or the like; however, the treads may be formed integral with the hub 26 as desired.

The axial separation of the planes 52 and 54 and the length of contact separation with a ground surface is a critical parameter in the subject invention, as will be detailed below, and is represented by "B" in FIG. 3. In a similar manner, the diameter of the treads is an important factor in the subject invention and is identified by "D" in FIG. 2.

Turning now to FIGS. 4 and 5 there will be seen theoretical and test results demonstrating the criticality of caster wheel diameter D, trail T, moment of inertia $I_W$, and separation B of co-rotating wheels to increase the critical velocity of a caster wheel. (Critical velocity may be defined as the velocity at which a caster wheel will begin to self-excite.)

From testing a variety of wheels on a test fork wherein trail was varied in small increments it was determined that for wheels from four inches to eight inches in diameter a trail of one inch or more enhances critical velocity. In this connection, FIG. 4 illustrates the critical velocity for a caster wheel of four inches in diameter and two eight-inch diameter wheels with different moments of inertia. It will be noted that for a trail of one inch or greater the critical velocity of the caster wheels tested increased significantly.

The critical velocity of a dual tread caster wheel may be represented by the formula:

$$V_c = \frac{C_d T}{2 I_W} + \frac{1}{2} \sqrt{\left[\frac{C_d T}{I_W}\right]^2 + \frac{2 B^2 K_s T}{I_W}}$$

where
$V_C$ = critical shimmy speed, m/s
$C_d$ = torsional damping, N-s-m
$T$ = caster wheel trail, m
$I_W$ = mass moment of inertia of caster wheel about its vertical axis, kg-m$^2$
$B$ = separation of co-rotating treads, m
$K_s$ = tire slip coefficient, N This equation is utilized to plot the effect of separation of co-rotating treads on critical velocity. As seen in FIG. 5, critical velocity for co-rotating tread caster wheels having a diameter of four to eight inches is increased with an increase in tread separation from one-half to two inches. Moreover, the critical velocity is increased if the moment of inertia of the caster wheel is less than or equal to $1.1 \times 10^{-3}$ kg×m$^2$.

Summary of Major Advantages of the Invention

After reading and understanding the foregoing description of the invention, in conjunction with the drawings, it will be appreciated that several distinct advantages of the subject caster wheel are obtained. One of the major advantages is the provision of a caster wheel wherein tread separation in a range one-half to two inches increases the critical speed of a caster wheel of four-to-eight inches in diameter. Accordingly, it has been found that dual tread caster wheels for a wheelchair, gurney, cart, or the like may be utilized wherein shimmy of the wheel will be eliminated for normal operating speeds. The elimination of caster wheel shimmy not only minimizes the energy needed to drive a wheelchair but the threat of being thrown from the chair due to a sudden onset of shimmy has been minimized.

Still further, the critical speed of a dual tread caster wheel can be enhanced by construction of a caster wheel with a trail of one inch or greater and a moment of inertial of $1.1 \times 10^{-3}$ kg×m$^2$ or less.

In describing the invention, reference has been made to a preferred embodiment and illustrative advantages of the invention. Those skilled in the art, however, after reading the subject disclosure, may recognize additions, deletions, modifications, and/or other changes which will fall within the purview of the subject invention and claims.

We claim:

1. A dual co-rotating, non-rigid caster wheel for at least partially supporting a wheel chair, gurney, cart, or the like for reducing caster wheel shimmy comprising:

a hub having a central axis of rotation;

a first resilient peripheral tread extending circumferentially about said hub for contacting a ground surface and lying in a plane perpendicular to the central axis of rotation of said hub;

a second resilient peripheral tread extending circumferentially about said hub for contacting a ground surface, co-rotating with said first peripheral tread and having the same diameter length as said first tread, and lying in a second plane mutually parallel with said first plane and being laterally displaced from said first plane;

said first and second resilient peripheral treads defining a separation groove therebetween;

means for pivoting said caster wheel about a first vertical axis located between said first and second treads and equidistant to said treads, said first vertical axis being a positive trail distance away from a second vertical axis extending through a center point of said hub;

the diameter of said treads being between about four and eight inches and the axial distance between said first and second peripheral treads about said hub being between about one-half and two inches wherein operating speed may be enhanced without producing self-excited caster wheel oscillation or shimmy effects.

2. A dual co-rotating, non-rigid caster wheel for at least partially supporting a wheel chair, gurney, car, or the like for reducing caster wheel shimmy comprising:

a hub having a central axis of rotation;

a grooved resilient peripheral tread having a first portion extending circumferentially about said hub for contacting a ground surface and lying in a plane perpendicular to the central axis of rotation of said hub, and a second portion extending circumferentially about said hub for contacting a ground surface, co-rotating with said first portion and having the same diameter length as said first portion, and lying in a second plane mutually parallel with said first plane and being laterally displaced from said first plane;

means for pivoting said caster wheel about a first vertical axis located between said first and second tread portions and equidistant to said portions, said first vertical axis being a positive trail distance away from a second vertical axis extending through a center point of said hub; and the diameter of said tread portions being between about four and eight inches and the axis distance between said first and second tread portions about said hub being between about one-half and two inches wherein operating speed may be enhanced without producing self-excited caster wheel oscillation or shimmy effects.

3. A dual co-rotating, non-rigid caster wheel as defined in claim 1 or 2 wherein:

said trail distance is greater than or equal to one inch.

4. A dual co-rotating, non-rigid caster wheel as defined in claim 1 or 2 wherein:

the mass moment of inertia of said non-rigid caster wheel about its vertical axis is less than $1.1 \times 10^{-3}$ kg$\times$m$^2$.

5. A dual co-rotating, non-rigid caster wheel as defined in claim 4 wherein:

said trail distance is greater than or equal to one inch.

6. A dual co-rotating, non-rigid caster wheel as defined in claim 1 or 2 wherein:

said lateral displacement being related to the distance between said first vertical axis and a second vertical axis extending through a center point of said hub in accordance to $$Vc = \frac{Cdt}{2Iw} + \frac{1}{2}\sqrt{\left[\frac{CdT}{Iw}\right]^2 + \frac{2B^2 K_s T}{Iw}}$$

wherein

Vc=critical shimmy speed, m/S

Cd=predetermined torsional damping of wheel, N-s-m/rad

T=Caster wheel trail=said distance between the first and the second vertical axis, m B=length of separation of tread groove, m Ks=predetermined tire slip coefficient, N Iw=predetermined mass moment of inertia of caster wheel about its vertical axis, kg-m$^2$ such that when given any particular T, B can be accordingly determined to achieve said desired critical shimmy speed and when given any particular B, T can be approximately determined to achieve said desired critical shimmy speed.

* * * * *